United States Patent
Sousa et al.

[11] Patent Number: 5,832,044
[45] Date of Patent: Nov. 3, 1998

[54] TRANSMITTER ANTENNA DIVERSITY AND FADING-RESISTANT MODULATION FOR WIRELESS COMMUNICATION SYSTEMS

[75] Inventors: Elvino S. Sousa, 425 Glencairn Avenue, North York, Ontario, Canada, M5N 1V4; Victor M. DaSilva, Morris Plains, N.J.

[73] Assignee: Elvino S. Sousa, North York, Canada

[21] Appl. No.: 721,966

[22] Filed: Sep. 27, 1996

[51] Int. Cl.⁶ .............................. H04B 7/10; H04B 11/12; H04L 27/10; H04L 27/04
[52] U.S. Cl. .......................... 375/347; 375/280; 375/281; 375/299; 455/132
[58] Field of Search .................................... 375/347, 299, 375/267, 286, 200, 222, 279–281, 308; 455/101, 132, 277.1, 277.2

[56] References Cited

U.S. PATENT DOCUMENTS

| | | | |
|---|---|---|---|
| 5,048,057 | 9/1991 | Saleh et al. | 375/267 |
| 5,088,113 | 2/1992 | Wei | 375/280 |
| 5,216,694 | 6/1993 | Wei | 375/286 |
| 5,289,501 | 2/1994 | Seshadri et al. | 375/286 |
| 5,636,242 | 6/1997 | Tsujimoto | 375/200 |
| 5,640,417 | 6/1997 | Barabash et al. | 375/222 |

*Primary Examiner*—Chi H. Pham
*Assistant Examiner*—Khai Tran
*Attorney, Agent, or Firm*—Lynn C. Schumacher; Hill & Schumacher

[57] ABSTRACT

The present invention provides a bandwidth-efficient fading-resistant transmission scheme where a base station implements transmitter diversity using L antennas or L carrier frequencies or L time slots, regardless of the use of frame oriented power control. When the antennas or carriers are spaced sufficiently far apart, or when a different power is used for each power control frame, the transmission from each antenna or carrier or time frame undergoes independent fading. These transmissions are coordinated to mitigate the effects of Rayleigh fading and the mobile receiver can recover the entire L-dimensional transmitted vector as long as the signal energy of at least one coordinate is large enough. L-dimensional fading-resistant signal constellations are generated by maximizing a figure of merit for the Rayleigh fading channel. This scheme offers a significant performance improvement over a conventional single-antenna or single-carrier narrowband BPSK scheme when coding is ineffective due to slow fading. When there is background white Gaussian noise, the fading-resistant scheme has a significant energy savings advantage over an uncoded BPSK scheme, for a given bit error rate. In the forward link of a cellular network, where cochannel interference is the dominant source of noise, the fading-resistant scheme results in a significant capacity increase over uncoded BPSK, for a given bit error rate. Both coherent and differentially coherent systems are disclosed.

25 Claims, 5 Drawing Sheets

ROTATED CONSTELLATION

FIG.3a
(PRIOR ART)
BASELINE CONSTELLATION

FIG.3b
ROTATED CONSTELLATION

FIG.3c
KERPEZ CONSTELLATION

BASELINE CONSTELLATION
FIG.4a
(PRIOR ART)

ROTATED CONSTELLATION
FIG.4b

TRANSMITTER ANTENNA DIVERSITY AND FADING-RESISTANT MODULATION FOR WIRELESS COMMUNICATION SYSTEMS

FIELD OF THE INVENTION

The present invention relates to a method of fading-resistant modulation for wireless communication systems prone to Rayleigh fading. More particularly, the method relates to the use of transmitter diversity and the design of transmission signal space constellations used therewith which are resistant to fading compared to systems not using transmitter diversity. The resulting constellation symbols are represented as vectors in L-dimensional space and their components are transmitted in different antennas, carrier frequencies, or time slots which have been designed to undergo essentially independent fading. The resulting scheme has a significantly superior performance to a system not using diversity or a system that uses the standard L-dimensional hypercube (with different components being transmitted over different antennas, frequencies, or time slots) as the signal constellation.

BACKGROUND OF THE INVENTION

A major problem associated with wireless communication systems is fading of the transmitted signal of the type arising due to multi-path propagation of the radio signal in which the amplitude of the signal undergoes random fluctuations at the receiver. Such random fluctuations are typically modelled by a Rayleigh distributed random variable and the resulting fading is typically referred to as Rayleigh fading. Examples of such channels include the mobile radio communications channel where signals are reflected from buildings and mountains, indoor wireless communication channels where signals are reflected by walls, furniture, and people.

In a digital communication system information is transmitted as a sequence of symbols belonging to some signalling alphabet. The signalling alphabet is represented as a set of Q vectors in an L-dimensional vector space and is referred to as the signalling constellation. These vectors are also referred to as points in the signalling constellation. Each transmitted symbol (vector, or point) carries $\log_2 Q$ bits of information.

The problem of signal fading manifests itself as a distortion of the signalling constellation where some of the points move closer together. The result is that at the receiver errors are made during the detection process (information decoding) where a given transmitted constellation point is interpreted as a different constellation point as a result of channel noise and errors in transmission occur. Techniques to reduce the problem of Rayleigh fading include the use of frequency, time, and antenna diversity. With frequency diversity signals are transmitted over different carrier frequencies; with time diversity signals are transmitted over different time slots; and with antenna diversity the signal is transmitted or received over multiple antennas.

In typical frequency or time diversity the same signal is transmitted over the different carrier frequencies or time slots. This results in a decrease of the number of bits per Hertz and a consequent loss in spectral efficiency. With receiver antenna diversity the same signal is received over different antennas, there is no loss in spectral efficiency, but there is a requirement for the use of at least two antennas at the receiver with a sufficient separation which may be difficult to implement in small terminals.

To maintain a high spectral efficiency frequency or time diversity should be based on the transmission of different information symbols over the different frequencies or time slots However if we split the information bit stream into a set of substreams and transmit each sub-stream over a different frequency or time slot then there is no benefit to using diversity. Thus far the use of antenna diversity has been relegated mostly to the receiver. Some schemes of transmitter diversity have been developed where a signal and a delayed version of itself have been transmitted on two separate antennas. The effect is to make the channel frequency selective and to allow for the use of equalizers at the receiver. Another approach to implement transmitter diversity is to transmit different bit streams on the different antennas and use orthogonal signals so that the transmissions over the different antennas do not cause mutual interference. This scheme then becomes similar to the spectrally efficient schemes for frequency and time diversity that we have discussed above but also does not achieve the usual benefits of diversity.

If we consider the spectrally efficient transmitter antenna, frequency, and time diversity schemes where the information bit stream is divided into sub-streams and where each sub-stream is transmitted over a different antenna, a different frequency, or a different time slot, then taken jointly the transmission of a set of symbols can be viewed as the transmission of a super symbol where in the case of BPSK this super-symbol can be represented by a vertex in an L-dimensional hyper-cube where L is the number of antennas, frequencies, or time slots. The reason for the poor performance of this scheme is that the hypercube signalling constellation is not fading-resistant. The main reason for the lack of fading-resistance is that for this constellation, compression of the constellation parallel to any of the coordinate axis (as a result of fading on one antenna, one frequency, or one time slot) results in points of the constellation coalescing thereby resulting in errors in the detected information bits. It would therefore be very advantageous to devise signalling constellations which achieve a high degree of spectral efficiency and are fading resistant. Such constellations would consist of points in an L-dimensional vector space where L is the number of antennas, carrier frequencies, or time slots with relatively independent fading such that strong fading in one coordinate (one antenna, frequency, or time slot) does not cause two of the constellation points to approach each other.

Further, In present state of the art cellular systems the transmitter power is adjusted once every preselected time frame—power control slot, or power control sub-group. For example, power is adjusted every 20 milli-second time frame in the forward link (base to mobile) of the IS-95 (CDMA) system or every 1.25 milli-second frame (power control group) in the reverse link of this system. In state of the art mobile radio systems power control is one of the key issues and future systems will have smaller and smaller power control frames. The goal of the power control algorithm is to maintain a constant signal to noise ratio at the receiver. However as a result of the required system overhead to transmit power control bits and the delay incurred in transmitting the power control bits there will always be (residual) variations in the received power level from frame to frame regardless of the rate of power control adjustments. As a result of the power control, the variation in received power level (i.e. power control error) will be independent from frame-to-frame. This variation in power level is similar to the variations that arise due to fading and as in the case of diversity discussed above a spectrally efficient coding scheme (signal constellation) is required to mitigate the effect of these power variations and consequently reduce the probability of error in the channel.

SUMMARY OF THE INVENTION

The present invention provides a method for fading-resistant modulation for wireless communication systems and addresses the problem of transmitting information with propagating signals through random or fading communication channels in a spectrally efficient manner. The invention provides a method for the use of transmitter antenna, frequency, or time diversity, to attain a significant performance increase over systems not utilizing diversity and at the same time avoid the loss in spectral efficiency that is characteristic of typical transmitter diversity schemes, through the design of transmission signal space constellations which are resistant to fading in the sense that the fading of the total received signal is significantly improved in comparison to similar systems which do not use transmitter diversity, or use transmitter diversity with the standard L-dimensional hypercube as the signal constellation.

The technique uses transmitter diversity and can be used in systems that employ either of the three types of transmitter diversity: antenna diversity, frequency diversity, or time diversity. These diversity techniques consist of the simultaneous transmission of data modulated signals over a set of L different antennas, L different carrier frequencies, or L different time slots, in a coordinated (jointly encoded) manner. The waveforms transmitted on the L different antennas are designed to be orthogonal. These waveforms are also inherently orthogonal in the case of the use of L carrier frequencies or L time slots.

The L different antennas, L different carrier frequencies, or L different time slots, are chosen so that the signal fading is essentially independent among them. Ideally the signal fading over these different diversity paths would be independent. As in typical digital modulation schemes the transmitter transmits a sequence of symbols (waveforms) from some fixed symbol alphabet. Each waveform may be represented as a vector in an L-dimensional vector space. The signaling alphabet can be represented as a set of vectors which is typically called the signaling constellation. Each of these vectors has L components. In the current invention each of the L components of a constellation vector is transmitted in a different antenna (case of antenna diversity), a different carrier frequency (case of frequency diversity), or a different time slot or time frame (case of time diversity).

If the constellation is chosen as the set of vertices of a hyper-cube then the transmitter diversity system just described would have the same performance as a system with the parameter L=1, i.e. no transmitter diversity. However in the current invention we describe methods to make the diversity system have a performance that is significantly superior to that of the non-diversity system by changing the signaling constellation to a new constellation which is obtained by maximizing a fading-resistance measure. This measure has the characteristics that under the effect of Rayleigh fading the points in the signal constellation maintain a large separation. In particular, this fading resistance measure has the characteristics that the resulting derived constellation has the property that none of the points of the constellation are superimposed by collapsing the constellation parallel to any of the coordinate axes.

In a preferred embodiment of the method the points of the signalling constellation are obtained by starting with the L-dimensional hypercube and transforming it by applying an orthogonal transformation (a set of rotations and reflections) in L-dimensional space. More generally, the fading resistant constellation is obtained from the L-dimensional hyper-cube constellation by representing the hypercube constellation as a matrix, with rows equal to the signaling vectors (vertices of the hyper-cube), and multiplying this matrix by an L×L orthogonal matrix. A procedure to find good orthogonal transformation matrices is given and some good sets of rotation matrices (orthogonal transformation matrices) for the 2,3,4,5 dimensional cases are specified.

We also realize that there are other constellations, which are not obtained from the L-dimensional hyper-cube by an orthogonal transformation, which would have a high degree of fading-resistance. One such example is the Kerpez constellation which was designed for transmitting signals on wireline channels with non-symmetric noise characteristics.

In another embodiment of the method of the present invention the signals transmitted in each antenna, carrier frequency, or time slot, which correspond to particular components of the signaling vectors, are differentially encoded. As for the previous case (the case of coherent detection) the use of the L-dimensional hypercube as a signaling constellation offers no advantage for the transmitter diversity system over the case L=1. However, a transformed constellation (different orthogonal matrix than above) offers significant improvements. This differential scheme can also be used in systems with either of the three types of diversity: antenna, frequency, or time.

In this disclosure we give the approach to find good orthogonal transformations (generalized rotation matrices) by factoring the orthogonal matrix into a product of Givens matrices and doing a computer search for optimum rotation angles. Minor modifications to this approach and other approaches will produce other rotation matrices which have similar fading resistance and are significantly better than the standard hypercube constellation.

The method disclosed herein is advantageous in systems which suffer from the so-called frequency non-selective fading (also called flat fading) and where it is difficult to implement receiver antenna diversity. In such a system it is typically desirable to implement transmitter antenna diversity since the receiver terminal is small and does not have the required dimensions to allow the installation of multiple antennas with sufficient inter-antenna spacing. The base station to mobile terminal link of a cellular system is a prime example of this application, especially in cases where the transmitted signal bandwidth is not significantly greater than the coherence bandwidth of the channel.

In a digital cellular system such as those standardized in IS-136, IS-95, GSM, information bits are transmitted in blocks (slots, time frames). In these systems the transmitter power is typically controlled (adjusted) so as to attempt to maintain a constant power (or signal to noise ratio) at the receiver. In the case of IS-95 the power is controlled (adjusted) once every 20 milli-second time frame in the forward channel and once every 1.25 milli-second time frame in the reverse channel. However when the terminal is in motion even after the control of power there is still a residual variation in the power of the received signal within the power control time frame. This variation is similar to signal fading. The method disclosed herein can be used to encode the transmitted signal in such a way that different components of each signal constellation vector are transmitted in different time slots and hence undergo different variations in received power level. The rotated constellations presented (whether for the case of coherent detection or differential detection) will have significant performance gains over the standard hypercube constellations which in this case correspond to transmitting all the components of each constellation point sequentially in the same time frame.

The present method provides for the joint encoding of signals transmitted over a set of L-antennas using transformations of the basic hypercube signal constellation. The invention contemplates joint encoding along time as well as across signals transmitted by different antennas. Such methods can be realized using trellis codes, convolutional codes, or block codes, where each code symbol is a point in the constellations disclosed herein and where the different components of each constellation point (each trellis code symbol, or convolutional code symbol, or block code symbol) are transmitted in the different antennas (or different frequencies, or different time slots).

In another application a radio system may use L carrier frequencies that have a sufficiently large frequency spacing so that the fading is independent over the different frequencies. The case L=2 would be sufficient to result in a significant improvement with our scheme. In this case we design signal constellations which can be represented as sets of points (vectors) in a 2-dimensional space (the plane). In this case the hypercube constellation is the well known QPSK constellation (except that the two axes correspond to two different carrier frequencies and not the two different phases—cos and sin) and applying the method of the present invention the orthogonal transformation corresponds to a rotation in the plane and provides an optimum rotation angle of approximately 31.7 degrees.

The present invention provides a method of fading-resistant modulation for wireless communication systems using transmitter antenna diversity. The method comprises providing an L-dimensional signalling constellation comprising Q points, wherein each point represents a vector in a vector space, the vector space comprising L orthogonal coordinate axes, and the constellation points being such that any two of them are vectors which differ in a plurality of their components. The method includes transmitting each of said L components of said signalling constellation over one of either L different antennas, L different carrier frequencies and L different time slots.

In another aspect the invention provides method of fading-resistant modulation for wireless communication systems. The method comprises providing an L-dimensional signalling constellation comprising L orthogonal coordinate axes and $2^L$ constellation points wherein each of said $2^L$ points represent a vector in a vector space, and the constellation points being such that any two of them are vectors which differ in a plurality of their components. The method includes transmitting each of said L components of said transformed signalling constellation over one of either L different antennas, L different carrier frequencies and L different time slots.

BRIEF DESCRIPTION OF THE DRAWINGS

The method of fading-resistant modulation for wireless communication systems in accordance with the present invention will now be discussed, by way of example only, reference being had to the accompanying drawings, in which:

FIG. 3b is a rotated constellation (L=2) constructed according to the method of the present invention providing increased fading resistance in a wireless communication system over the constellation of FIG. 3a;

DETAILED DESCRIPTION OF THE INVENTION

FADING-RESISTANT MODULATION

Channel Model 1:Multi-Antenna Transmitter Diversity

Figure 1:
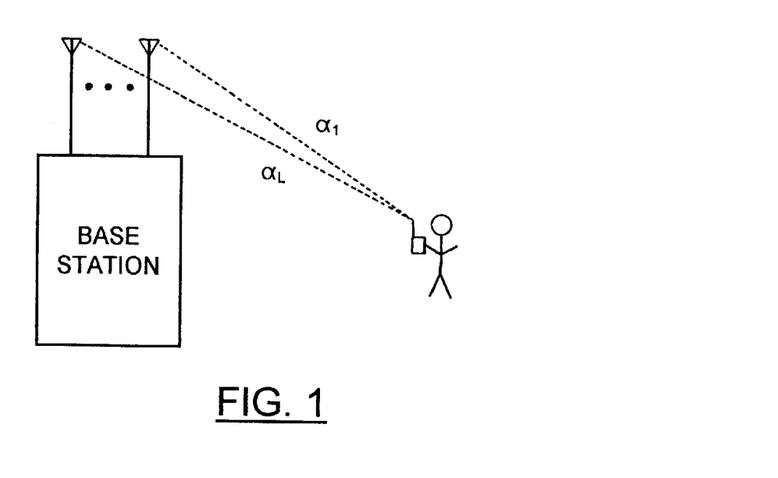
FIG. 1 is a diagrammatic representation of a forward link channel model.

The forward link channel (base station to mobile terminal) model is depicted in FIG. 1. The base station has L transmitter antennas, the mobile receiver has a single antenna, and each of the L links has a different fading amplitude. The received signal is given by:

$$r(t) = \sum_{i=1}^{L} \alpha_i m_i' s_i(t)\cos(\omega_c t + \theta_i) + n(t), 0 \leq t \leq T \quad (1.1)$$

The signal from the transmitter's $i^{th}$ antenna is a pulse amplitude modulated (PAM) signal and $m_i$ is the signal amplitude, $s_i(t)$ is the pulse shape, $\alpha_i$ is the fading amplitude of link l, and n(t) is a white Gaussian noise process with power spectral density $N_0/2$. It is assumed that the fading amplitude for a given link is constant over the signalling interval [0,T] and that the receiver uses coherent detection. The signals $s_i(t)$, $s_j(t)$, i*j, are assumed to be orthogonal and all of the energy of $s_i(t)$, $1 \leq i \leq L$, is contained in [0,T]. As an example, the signals may be spread spectrum or code division multiple access (CDMA) signals.

Figure 2:
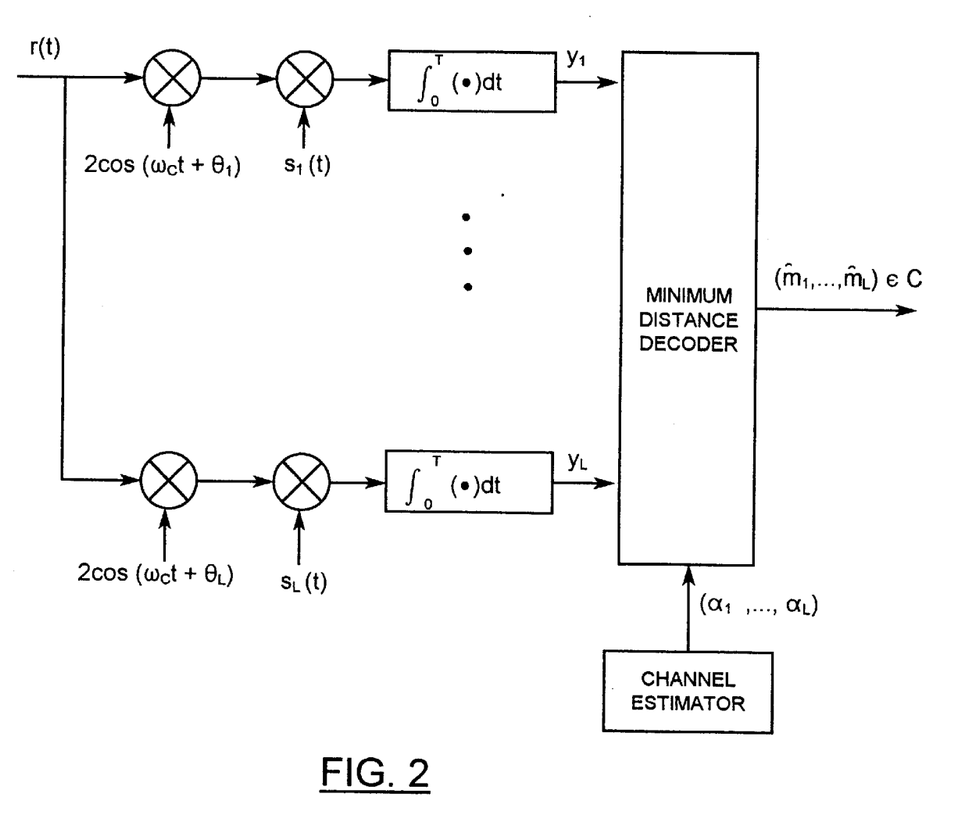
FIG. 2 is a schematic block diagram of a receiver for receiving L orthogonal transmissions.

The optimum receiver consists of a bank of L correlators, as shown in FIG. 2. The output of the $i^{th}$ correlator is:

$$y_i = 2\int_0^T r(t)s_i(t)\cos(\omega_c t + \theta_i)dt \quad (1.2)$$
$$= \alpha_i m_i E_s + \eta_i, 1 \leq i \leq L$$

where $$E_s = \int_0^T s_i^2(t)dt$$

is the pulse energy and $$\eta_i = 2\int_0^T n(t)s_i(t)\cos(\omega_c t + \theta_i)dt,$$

$1 \leq i \leq L$, are uncorrelated zero-mean Gaussian random variables with variance $N_0 E_3$. The received vector $y=(y_1, y_2, \ldots$ . ,$y_L$) is fed into a decision device which estimates the transmitted vector m=($m_1,m_2,\ldots,m_L$). It is assumed that the receiver can estimate the fading amplitudes $\alpha_i$. The receiver finds the L-dimensional constellation point in C, with coordinates suitably amplified, that has the closest Euclidean distance to the received vector y. That is, the receiver picks the symbol $\hat{m}=(\hat{m}_1,\hat{m}_2,\ldots,\hat{m}_L)\in$ C that minimizes $$\sum_{i=1}^{L} (y_i/E_s - \alpha_i \hat{m}_i)^2.$$

A symbol detection error occurs when $\hat{m}\neq m$.

It is noted that the transmission bit rate can be increased with no loss in performance and without using more bandwidth by transmitting two carriers that are in phase-quadrature from each antenna. The received signal becomes:

$$r(t) = \sum_{i=1}^{L} \alpha_i(m_i^c s_i(t)\cos(\omega_c t + \theta_i) + m_i^s s_i(t)\sin(\omega_c t + \theta_i)) + n(t), \quad (1.3)$$

$$0 \leq t \leq T,$$

where $m_1^c$ and $m_i^s$ are the signal levels corresponding to the two orthogonal carriers transmitted on the $i^{th}$ antenna. Orthogonality among $s_i(t)$, $1 \leq i \leq L$, ensures that the 2L signals do not interfere with one another. Similarly, QPSK has the same performance as BPSK and the bandwidth efficiency is twice as high.

The communication links shown in FIG. 1 are not necessarily line-of-sight. In a multipath environment, where there is no line-of-sight component, a Rayleigh fading model is normally assumed. If the channel delay spread is small relative to the symbol period, orthogonality between the L links is still possible. The fading amplitudes $\alpha_i$, are modelled as independent and identically distributed Rayleigh random variables with probability density function $$f_\alpha(\alpha)=2\alpha e^{-\alpha^2}, \alpha \geq 0. \quad (1.4)$$

The assumption of independent fading is valid if the transmitter antennas are spaced sufficiently far apart, which is relatively easy to do when the transmitter is the base station.

The fading-resistant transmission schemes discussed hereinafter forming the present invention assume that the receiver is capable of estimating the fading amplitude of each link This is possible if the fading amplitudes vary slowly over time. If the fading amplitudes vary quickly over time, the performance of the receiver will degrade due to estimation errors.

Baseline Scheme: Independent BPSK Signals

The baseline scheme consists of a transmitter with L antennas which sends either a+1 or −1 bit on each antenna, independently of the rest, and the output of the $i^{th}$ correlator is given by (1.2) with $m_1 \in \{1,-1\}$. This corresponds to sending independent BPSK signals on each antenna. There is an L-fold expansion in bandwidth over the L=1 case in order to have L orthogonal transmissions but the overall data rate also increases by a factor of L so that there is no bandwidth penalty.

For optimal detection, the correlator output $y_i$ is fed into a threshold device which outputs a 1 if the input is positive, and a−1 otherwise. The probability of bit error is (e.g. see J. Proakis, *Digital Communications,* 2nd edition, McGraw-Hill Book Company, N.Y., 1989., p. 717)

$$P(\text{error}) = \frac{1}{2}\left(1 - \sqrt{\frac{E_b/N_0}{E_b/N_0 + 1}}\right) \quad (1.5)$$

where $E_s=\overline{\alpha^2}E_s/2=E_s/2$ is the average received bit energy. Eq. (1.5) applies to each of the L links, and so the overall bit error rate is also given by (1.5). For this scheme the overall bit error rate is independent of L and there is no advantage over single-antenna BPSK.

Construction of Fading-Resistant Constellations

The ideal figure of merit in the design of signaling constellations is that of the probability of symbol error. However, it is an untractable problem in mathematics to construct signaling constellations that minimize the probability of error in Rayleigh fading channels. As such we will use a sub-optimal figure of merit. Other similar figures of merit will yield good signaling constellations. The fundamental property of a good signaling constellation is that the encoding of the information bits to the transmitted waveforms should be such that a given information bit has an effect on the signals on a multiple number of coordinates of the constellation points. In this respect the L-dimensional hypercube, with the edges of the cube being aligned with the coordinate axes, is the worst constellation since in this case each information bit affects the signal in only one coordinate, and with fading in that coordinate the bit is lost. In other words any two points of the signaling constellation should have a large number of components which differ significantly.

The following quantity, hereinafter the constellation figure of merit for the Rayleigh fading channel, gives an indication of the performance of a signal constellation at high SNR, $$CFM_{Rayleigh}(C) = \min_{\substack{m,\hat{m}\in C \\ m \neq \hat{m}}} \sum_{\substack{i=1 \\ m_i \neq \hat{m}_i}}^{L} (m_i - \hat{m}_i)^2/E \quad (1.6)$$

where E is the average symbol energy of the constellation C. Note that (1.6) is scale-invariant, that is, $CFM_{Rayleigh}(aC) = CFM_{Rayleigh}(C)$, where a is a scalar. We describe a method for constructing L-dimensional fading-resistant constellations which have a large $CFM_{Rayleigh}$. We are interested only in constellations where $m_i \neq \hat{m}_i$, $1 \leq i \leq L$.

Given an L-dimensional constellation of Q points, there is applied a transformation to the constellation which preserves the Euclidean distances between points but improves the constellation's resistance to fading. We impose the restriction that the transformation preserve Euclidean distances and norms because we do not want to degrade the performance of the constellation in the AWGN channel. Such transformations are called isometries.

The original constellation is represented as a $|C|\times L$ matrix C, where each row of the matrix corresponds to a point in the L-dimensional constellation. One example of a distance-preserving transformation is to multiply this matrix by an orthogonal L×L matrix A. The optimal matrix A maximizes the fading-resistance of the transformed constellation CA, that is, it maximizes $CFM_{Rayleigh}(CA)$.

In Appendix A it is shown how an L×L orthogonal matrix A can be written as the product of $$\binom{n}{2}$$

rotation matrices and a reflection matrix. From (A.5), we see that multiplication of the constellation matrix C by an arbitrary orthogonal matrix A has the following geometrical interpretation. The constellation is rotated with respect to the (i,j)-plane by an amount $\theta_{ij}$, $1 \leq i \leq L-1$, $i+1 \leq j \leq L$, and there are $$\binom{L}{2}$$

such rotations. Then the constellation is reflected in the $i^{th}$ axis, where the matrix $\hat{I}$ has (i,i) entry equal to $-1$, and the number of such reflections is equal to the number of $-1$ elements on the main diagonal of $\hat{I}$. Writing $A=QI$, where Q is the product of $$\binom{L}{2}$$

rotation matrices in (A.5), we see that $$\text{CFM}_{Rayleigh}(CA)=\text{CFM}_{Rayleigh}(CQ\hat{I})=\text{CFM}_{Rayleigh}(CQ) \quad (1.7)$$

where the second identity in (1.7) follows because the matrix $CQ\hat{I}$ is the matrix $CQ$ with several of its columns negated, and negating the columns of a constellation matrix does not affect the $\text{CFR}_{Rayleigh}$ of the constellation. Rather than look for an optimal constellation CA it is sufficient to look for an optimal constellation CQ.

The present method of obtaining an optimal constellation $C_{opt}=CQ$, that is, one with maximum $\text{CFM}_{Rayleigh}(CQ)$, given a starting constellation C, comprises varying $$\binom{L}{2}$$

rotation angles according to a numerical optimization or search algorithm. The constellation C is rotated with respect to the (i,j) plane, $1 \leq i \leq L-1$, $i+1 \leq L$. Note that Q does not need to be computed explicitly. There are $$\binom{L}{2}$$

degrees of freedom and for L=2,3 and for a large angle discretization interval (for example, 1°) the search for the optimal angles can be made exhaustively but for $L \geq 4$ and for reasonably small discretization intervals (for example, less than 5°) the exhaustive search method takes too long. For these larger values of L, we pick at random many different starting rotation vectors and use a gradient descent method each time to converge to a (possibly local) maximum; then a possibly suboptimal rotation vector is obtained corresponding to the maximum of all these trials.

In general, we can start with constellations drawn from L-dimensional packings. For a given number of constellation points, points are drawn from the minimum-energy shells of these packings. These constellations are then rotated in L-space so as to maximize $\text{CFM}_{Rayleigh}$. For example, in two dimensions two possible packings are $Z^2$ and the hexagonal lattice. In three dimensions, possible packings are the hexagonal close packing, tetrahedral packing, face centered cubic lattice, body centered cubic lattice, and the $Z^3$ lattice. These lattices are defined, for example, in J. H. Conway, N. J. A. Sloane, *Sphere Packings, Lattices and Groups*, Springer-Verlag, N.Y., 1993. Denser packings are preferred because large constellations drawn from these packings have better performance in the additive white Gaussian noise channel.

Figure 3A:
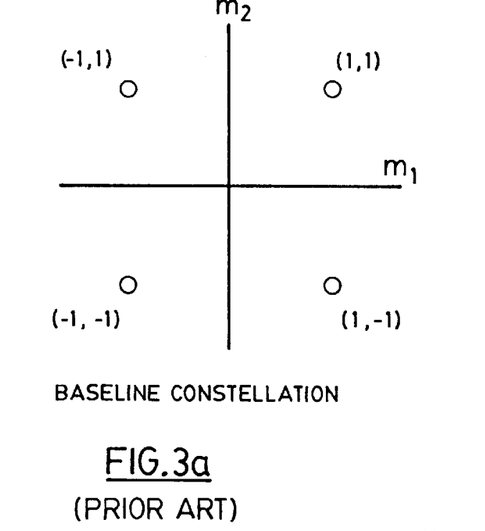
FIG. 3a is a prior art baseline constellation for L=2 with Q=9.
Figure 3B:
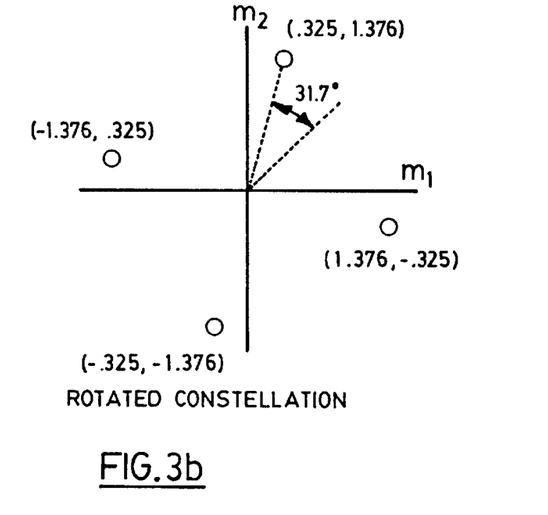

For the same bit rate and AWGN channel performance as the baseline scheme, we start off with the L-cube, which is the constellation for the baseline scheme. (This also corresponds to a single energy shell of the $Z^L$ lattice.) For example, when L=2, the baseline constellation matrix is $$C = \begin{bmatrix} 1 & 1 \\ 1 & -1 \\ -1 & 1 \\ -1 & -1 \end{bmatrix} \quad (1.8)$$

and the four constellation points are shown in FIG. 3a. In this case maximization of $\text{CFM}_{Rayleigh}$ is done by varying only one rotation angle. The optimal angle of rotation for this constellation can be found using an exhaustive search to be $\theta_{opt}=31.70°$, assuming a discretization interval of 0.1°. This optimal angle can be derived analytically as $$\theta_{opt} = \frac{1}{2} \tan^{-1}(2)$$

but the derivation is omitted for the sake of brevity. The optimally rotated constellation is $$C_{opt} = \begin{bmatrix} -0.325 & -1.376 \\ -1.376 & 0.325 \\ 1.376 & -0.325 \\ 0.325 & 1.376 \end{bmatrix} \quad (1.9)$$

The baseline constellation and the rotated constellation are shown in FIGS. 3a and 3b. Each row in the constellation matrix corresponds to a point $(m_1,m_2)$. The Kerpez constellation shown in FIG. 3c for comparison will be discussed below.

Figure 4A:
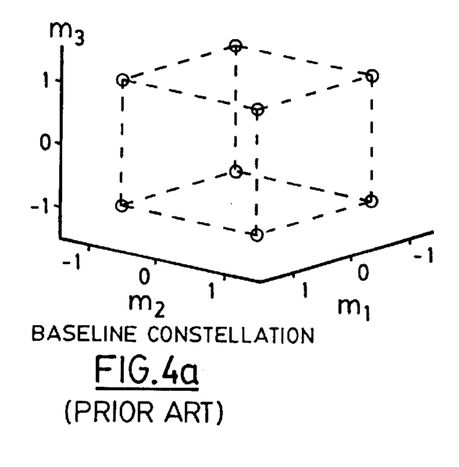
FIG. 4a prior art baseline constellation for L=3.
Figure 4B:
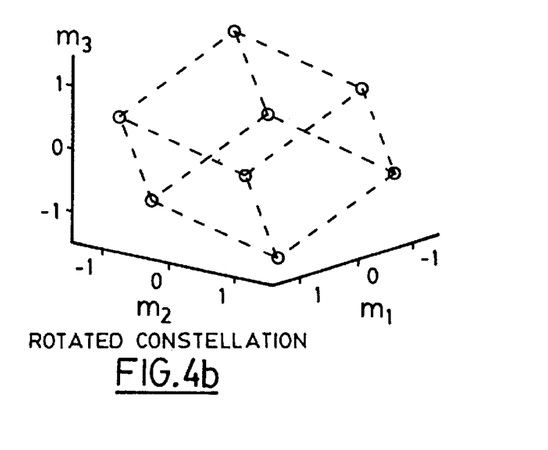
FIG. 4b is a rotated constellation (L=3) constructed according to the present invention.

When L=3 the baseline constellation C consists of the vertices of a three-dimensional cube and optimization is done over three rotation angles. The optimal rotation vector can be found using an exhaustive search to be $\theta_{opt}=[\theta_{12}, \theta_{13}, \theta_{23}]=[24°,36°,66°]$, using a discretization interval of 1°. Both the baseline constellation and the optimally rotated constellation are shown below, $$C = \begin{bmatrix} 1 & 1 & 1 \\ 1 & 1 & -1 \\ 1 & -1 & 1 \\ 1 & -1 & -1 \\ -1 & 1 & 1 \\ -1 & 1 & -1 \\ -1 & -1 & 1 \\ -1 & -1 & -1 \end{bmatrix} \quad (1.10)$$

$$C_{opt} = \begin{bmatrix} 0.177 & 0.474 & -1.656 \\ -0.997 & -1.003 & -0.998 \\ -0.480 & 1.654 & -0.181 \\ -1.655 & 0.176 & 0.476 \\ 1.655 & -0.176 & -0.476 \\ 0.480 & -1.654 & 0.181 \\ 0.997 & 1.003 & 0.998 \\ -0.177 & -0.474 & 1.656 \end{bmatrix}$$

These constellations are shown in FIGS. 4a and 4b.

For L≧4, an exhaustive search over the $$\binom{L}{2}$$

rotation angles in order to maximize $CFM_{Rayleigh}$ for the L-cube proved to be too time consuming. For these constellations, many rotation vectors were picked at random, and a gradient based approach was used to vary the rotation angles so as to converge to a local maximum For L=4 there are six degrees of freedom and the optimal rotation vector found was $\theta_{opt}=[\theta_{12},\theta_{13},\theta_{14},\theta_{23},\theta_{24},\theta_{34}]=[206°,15°,306°,42°,213°,31°]$. For L=5 there are ten degrees of freedom and the optimal rotation vector found was $$\begin{aligned}\theta_{opt} &= [\theta_{12},\theta_{13},\theta_{14},\theta_{15},\theta_{23},\theta_{24},\theta_{25},\theta_{34},\theta_{35},\theta_{45}]\\ &= [294°,349°,18°,340°,103°,184°,114°,275°,212°,25°]\end{aligned}$$

Kerpez Constellations

In K. J. Kerpez, "Constellations for good diversity performance", IEEE *Trans. Commun.*, vol. 41, pp. 1412–1421, September 1993, L-dimensional constellations were proposed for L-link wireline nonfading channels where the links have different noise powers. These constellations were derived heuristically and we note that they should also perform well in the case we are considering where the noise powers are equal but the fading amplitudes are different.

For these constellations, there are $M^L$ constellation points $(m_1, m_2, \ldots, m_L)$. Specification of $i_1 \in \{1,2,\ldots,M^L\}$ uniquely identifies the L-dimensional symbol, which has $j^{th}$ coordinate given by $$m_j = -2i_j + M^L + 1, \; i_j \in \{1,2,\ldots,M^L\} \qquad (1.11)$$

where $i_j$, $2 \leq j \leq L$, is related to $i_1$, by $$i_j = [(i_1 - 1)M^{L-j+1}] \bmod M^L + M^{L-j+1} + 1 - \left[\frac{i_1}{M^{j-1}}\right] \qquad (1.12)$$

We consider only the case M=2 so as to have the same bit rate as the baseline scheme. For example, when L=2, the Kerpez constellation is $$C = \begin{bmatrix} 3 & 1 \\ -1 & 3 \\ -3 & -1 \\ 1 & -3 \end{bmatrix} \qquad (1.13)$$

Figure 3C:
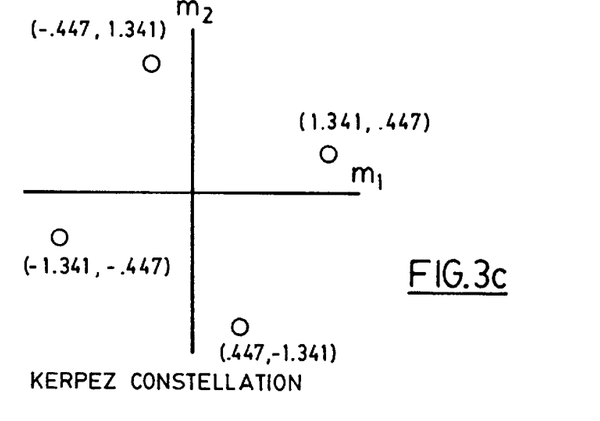
FIG. 3c is a Kerpez constellation (L=2) which when used according to the present invention provides increased fading resistance.

This constellation, normalized by $\sqrt{5}$ so that the symbol energy is the same as that of the baseline two-dimensional constellation, is shown in FIG. 3. As another example, when L=3, the set of constellation points is shown in the first column in Table 1.1. Note that, except for the L=2 case, the Kerpez constellations are not rotated versions of the baseline L-cube constellations. In fact, the points in a Kerpez constellation with L>2 do not all have the same energy.

From K. J. Kerpez, "Constellations For Good Diversity Performance", *IEEE Trans. Commun.*, Vol. 41, pp. 1412–1421, September 1993., the average symbol energy of the Kerpez constellation is $$E = \frac{L}{3}(2^{2L} - 1) \qquad (1.14)$$

and the minimum squared distance between constellation points is $d_{min}^2 = 4(2^{2L}-1)/3$.

The constellation figure of merit for the additive white Gaussian noise channel is thus $$CFM_{Rayleigh} = \frac{d_{min}^2}{E} = \frac{4}{L}, \qquad (1.15)$$

For the baseline constellation, $d_{min}^2=4$ and the constellation symbol energy is E=L so that $CFM_{AWGN}$ for the baseline constellation is also given by (1.15). Thus, for the AWGN channel the probability of symbol error of both the Kerpez and baseline schemes is the same at high signal-to-noise ratio. However, unlike the baseline scheme, the Kerpez constellation is resistant to fading because no two L-dimensional vectors have the same $j^{th}$ component $1 \leq j \leq L$. Even if all but one of the L components have a fading amplitude of zero, the receiver will be able to determine which of the $2^L$ vectors was sent as long as the signal energy in the non-faded component is strong enough.

The output of the $i^{th}$ correlator is given by (1.2) where $m_j$, $1 \leq i \leq L$, is given by (1.11). The total transmitter energy in the signalling interval [0,T] is, from (1.14), LE $\overline{m_i^2}/2 = L^2 E_s(2^{2L}-1)/6$ and L bits are transmitted during this interval. In order to compare the different schemes on the basis of the same energy per bit, we assume that $E_s=6E_b/(L(2^{2L}-1))$.

As in the previous section, the receiver requires knowledge of the fading amplitudes $\alpha_i$, $1 \leq i \leq L$. The receiver decides which L-dimensional symbol in C was transmitted using the same decision rule as in the previous section. The probability of bit error depends on how bit patterns of length L are assigned to constellation points. Given an L-dimensional constellation, we may wish to assign bit patterns to constellation points such that points separated by $d_{min}$ differ in only one bit. This is because in an AWGN channel, symbol detection errors are more likely to be associated with nearest-neighbour symbol pairs than with symbol pairs that are separated by a larger distance. For the Kerpez constellation it turns out that there is a simple method for achieving this as follows.

Method for Bit Pattern Assignment

There are $2^L$ constellation points. For a given constellation point with indexes, $(i_1, i_2, \ldots, i_L)$, $i_l \in \{1,2,3,\ldots,2^L\}$, we let $$i_1 = 1 + \sum_{n=1}^{L} 2^{n-1} a_n,$$

where $a_n \in \{0,1\}$. We compute $i_v$ using (1.12), for $2 \leq v \leq L$. If we assign the bit pattern $(a_1, a_2, \ldots, a_L)$ to the constellation point $(i_1, i_2, \ldots, i_L)$ then bit patterns that differ in only one location correspond to constellation points separated by $d_{min}$. The proof is given in Appendix B.

As an example, consider the case L=3. In Table 1.1 the mapping between constellation points and bit patterns is given. Note that $i_l$ is just the decimal representation of the bit pattern $a_1 a_2 a_3$ plus one. For this constellation $d_{min}^2=84$ and all pairs of constellation points separated by this squared distance (there are twelve of these pairs) differ in only one bit.

TABLE 1.1

Mapping of bit patterns to constellation points for L = 3 Kerpez constellation.

| $(m_1, m_2, m_3)$ | $(i_1, i_2, i_3)$ | $a_1 a_2 a_3$ |
| --- | --- | --- |
| (7, 1, 5) | (1, 4, 2) | 000 |
| (5, -7, 1) | (2, 8, 4) | 001 |

TABLE 1.1-continued

Mapping of bit patterns to constellation points for L = 3 Kerpez constellation.

| $(m_1, m_2, m_3)$ | $(i_1, i_2, i_3)$ | $a_1 a_2 a_3$ |
|---|---|---|
| (3, 3, −3) | (3, 3, 6) | 010 |
| (1, −5, −7) | (4, 7, 8) | 011 |
| (−1, 5, 7) | (5, 2, 1) | 100 |
| (−3, −3, 3) | (6, 6, 3) | 101 |
| (−5, 7, −1) | (7, 1, 5) | 110 |
| (−7, −1, −5) | (8, 5, 7) | 111 |

Channel Model 2: Multi-frequency Transmitter Diversity

L orthogonal links can be achieved using a single antenna at the transmitter and L carrier frequencies. If these carriers are separated far apart, the links will be orthogonal and the fading associated with each carrier will be independent. It may be easier to ensure orthogonality among links when there is delay spread by using a multi-frequency rather than a multi-antenna approach.

Figure 5:
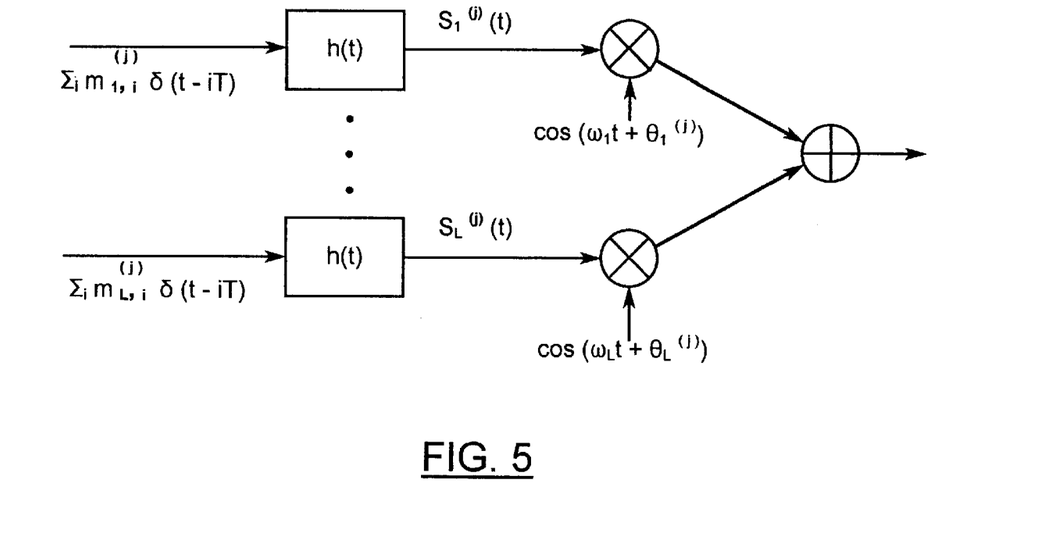
FIG. 5 is a block diagram of a multi-frequency transmitter for a base station.

Each base station transmits to a mobile using L carriers and a single antenna. (Cochannel base stations can use the same set of carrier frequencies $(\omega_1, \omega_2, \ldots, \omega_L)$.) The baseband signal transmitted from the $j^{th}$ base station at carrier frequency $\omega_l$, $1 \leq l \leq L$, is $$s_l^j(t) = \sum_i m_{l,j}^{(i)} h(t - iT). \quad (1.16)$$

h(t) is a band-limited pulse and $m_{l,j}^{(i)}$ is the symbol transmitted during the $i^{th}$ signalling interval [(i−1)T, iT]. For example, in the baseline BPSK scheme, $m_{l,j}^{(i)} \in \{-1, 1\}$. The block diagram for the transmitter is shown in FIG. 5.

Figure 6:
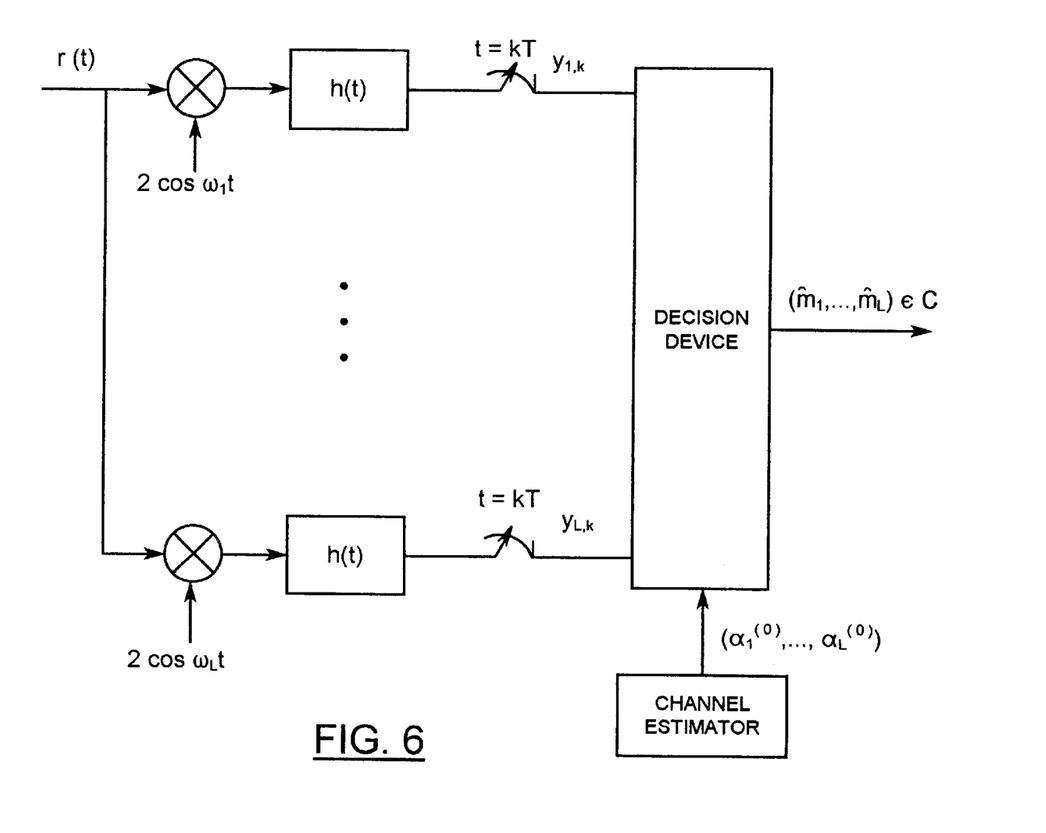
FIG. 6 is a block diagram of a multi-frequency receiver for receiving transmissions from the transmitter of FIG. 5.

The receiver has L demodulators and its block diagram is shown in FIG. 6. It is assumed that the carrier frequencies are spaced far apart and that signal components with center frequencies $|\Omega_{l1} - \Omega_{l2}|$, $\Omega_{l1} \neq \Omega_{l2}$, resulting from the demodulation operations, are filtered out by the lowpass filtering effect of h(t). The output of the matched filter in the $l^{th}$ branch is sampled at t=kT.

The decision device in FIG. 6 makes a decision on the received vector $y=(y_{1,k}, \ldots, y_{L,k})$. The decision device is simply a minimum distance decoder which uses estimates of the fading amplitudes. When the noise is Gaussian, this decision device is optimal. In the case we are considering, this detection strategy is sub-optimal. We assume that the mobile receiver correctly estimates the vector of fading amplitudes $\alpha=(\alpha_1^{(0)}, \ldots, \alpha_L^{(0)})$. The transmitted sequence of interest is $m=(m_{1,k}^{(0)}, \ldots, m_{L,k}^{(0)}) \in C$, where C is an L-dimensional constellation. The decision device outputs the vector $\hat{m}=(\hat{m}_1, \hat{m}_2, \ldots, \hat{m}_L) \in C$ such that $$\sum_{l=1}^{L} (y_{l,k} - \alpha_l^{(0)} \hat{m}_l)^2 \quad (1.17)$$

is minimized and a symbol decoding error occurs if $m \neq \hat{m}$.

Fading-resistant Cellular System

For the scheme we are proposing, $m_{l,k}^{(0)}$, $1 \leq l \leq L$, are coordinated and the receiver makes a decision on the entire received vector $y=(y_{1,k}, \ldots, y_{L,k})$. In order for the fading-resistant modulation scheme to have the same bandwidth efficiency as uncoded BPSK, we assume that C has $2^L$ points, so that L bits are transmitted for every vector of L symbols. We consider two different fading-resistant schemes. The first scheme uses rotated baseline constellations and the second scheme uses Kerpez constellations. The overall bandwidth occupied by the multi-frequency signal is B, where B is the bandwidth of the transmitted signal when only one carrier is used and for L>1 carriers, the bandwidth of a signal at a particular carrier frequency is B/L. Thus, the overall bandwidth and bit rate remain unchanged for different L. There is also no loss in bandwidth efficiency by having the carriers spaced far apart because the spectrum between the carriers is used by the other users.

Channel Model 3: Time Interleaving and Power Control

Figure 7:
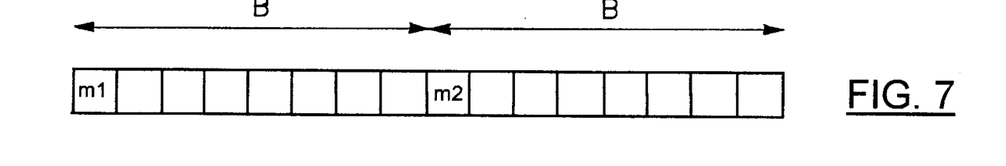
FIG. 7 illustrates a power control frame with 8 signalling intervals with the signalling vector L=2.

Diversity can be achieved using time interleaving and power control. In this case the transmitter uses a single antenna and a single carrier frequency. During each signalling interval, the transmitter transmits a coordinate of an L vector. A vector of L coordinates is transmitted by transmitting each coordinate in a separate power control time frame. The transmitter power remains constant for B signalling intervals (the duration of a power control time frame), and depending on the power received by the mobile receiver, the transmitter may either increase or decrease power during the next power control frame. The coordinates of an L vector are each transmitted in a different power control frame, and so the fading amplitudes associated with each coordinate will be independent, so that the fading-resistant scheme will perform well because the likelihood that all L coordinates are received with low energy is very unlikely. The larger the value of B the simpler the implementation, however, the power control scheme will not compensate for shorter durations of fluctuations in received power. FIG. 7 shows an example. In this case the vector has length L=2 and the two coordinates are transmitted in two separate power control frames.

B) DIFFERENTIALLY COHERENT FADING-RESISTANT MODULATION

Part B describes a bandwidth-efficient fading-resistant transmission process and several applications thereof. Differential encoding and detection is used in this embodiment of the process so that the receiver does not have to track the carrier phases of the L transmissions. Further, fading-resistant constellations are generated by optimizing a distance measure for the Rayleigh fading channel. Because this figure of merit is different than that used in Part A, the resulting optimally rotated constellations are also different than those described in Part A. This fading-resistant transmission scheme is described by the inventors in V. M. DaSilva, E. S. Sousa, "Differentially Coherent Fading-Resistant Transmission From Several Antennas", *Proc. 46th IEEE Vehicular Technology Conference, VTC '96*, Atlanta, USA, Apr. 28–May 1, 1996, which is incorporated herein by reference.

Channel Model 1: Multi-antenna Transmitter Diversity

The base station has L transmitter antennas, the mobile receiver has a single antenna, and each of the L links has a different fading amplitude. The received signal during the signalling interval [kT, (k+1)T] is $$r(t) = \sum_{i=1}^{L} \alpha_i x_{i,k} s_i(t - kT) \cos(\omega_c t + \theta_i) + n(t). \quad (2.1)$$

$s_i(t)$ is the pulse shape, $\alpha_i$ is the fading amplitude, $\theta_i$ is the carrier phase, and $x_{i,k}$ is the signal level corresponding to the $i^{th}$ link, respectively, n(t) is white Gaussian noise with power spectral density $N_0/2$. It is assumed that the fading amplitude and carrier phase for a given link are relatively constant over several consecutive signalling intervals, which is why the dependence of $\alpha_i(t)$ and $\theta_i(t)$ in (2.1) on t is not explicit, and that the receiver does not use local carriers that are in phase coherence with the received signals. The signals $s_i(t)$, $s_j(t)$, $i \neq j$, are assumed to be orthogonal and all of the energy of $s_i(t)$, $1 \leq i \leq L$, is contained in [0,T].

It is assumed that $\alpha_i$ are independent and identically distributed Rayleigh random variables with probability density function given by (1.4). The fading-resistant transmission schemes discussed in this chapter assume that the receiver is capable of estimating the fading amplitude of each link.

Baseline Scheme: Differential BPSK

Given L antennas, the transmitter can send either a +1 or −1 bit on each antenna independently of the rest and the received signal is given by (2.1) with $x_{i,k} \in \{1,-\}$. There is an L-fold expansion in bandwidth over the L=1 case in order to have L orthogonal transmissions but the overall data rate also increases by a factor of L so that there is no bandwidth penalty.

Assuming an optimum receiver for binary differential phase-shift keying, the conditional probability of bit error for link l is $$P(\text{error}|\alpha_i) = \frac{1}{2} e^{-\alpha_i^2 E_b/N_o}$$

where $$E_b = \int_0^T S_i^2(t)dt/2$$

is the bit energy in each link (e.g. see R. E. Ziemer, W. H. Tranter, *Principles of Communications: Systems, Modulation, and Noise*, Third edition, Houghton Mifflin Company, Boston, 1990, p. 485). Averaging over the fading amplitude, the probability of bit error for each link is (e.g. see J. Proakis, *Digital Communications*, 2nd edition, McGraw-Hill Book Company, New York, 1989., p. 717)

$$P(\text{error}) = \frac{1}{2(E_b/N_0 + 1)} \quad . \tag{2.2}$$

Equation (2.2) applies to each of the L links, and so the overall bit error rate is also given by (2.2). For this scheme the overall bit error rate is independent of L and there is no advantage in using more than one antenna.

Receiver for Fading-resistant Transmission

Figure 8:
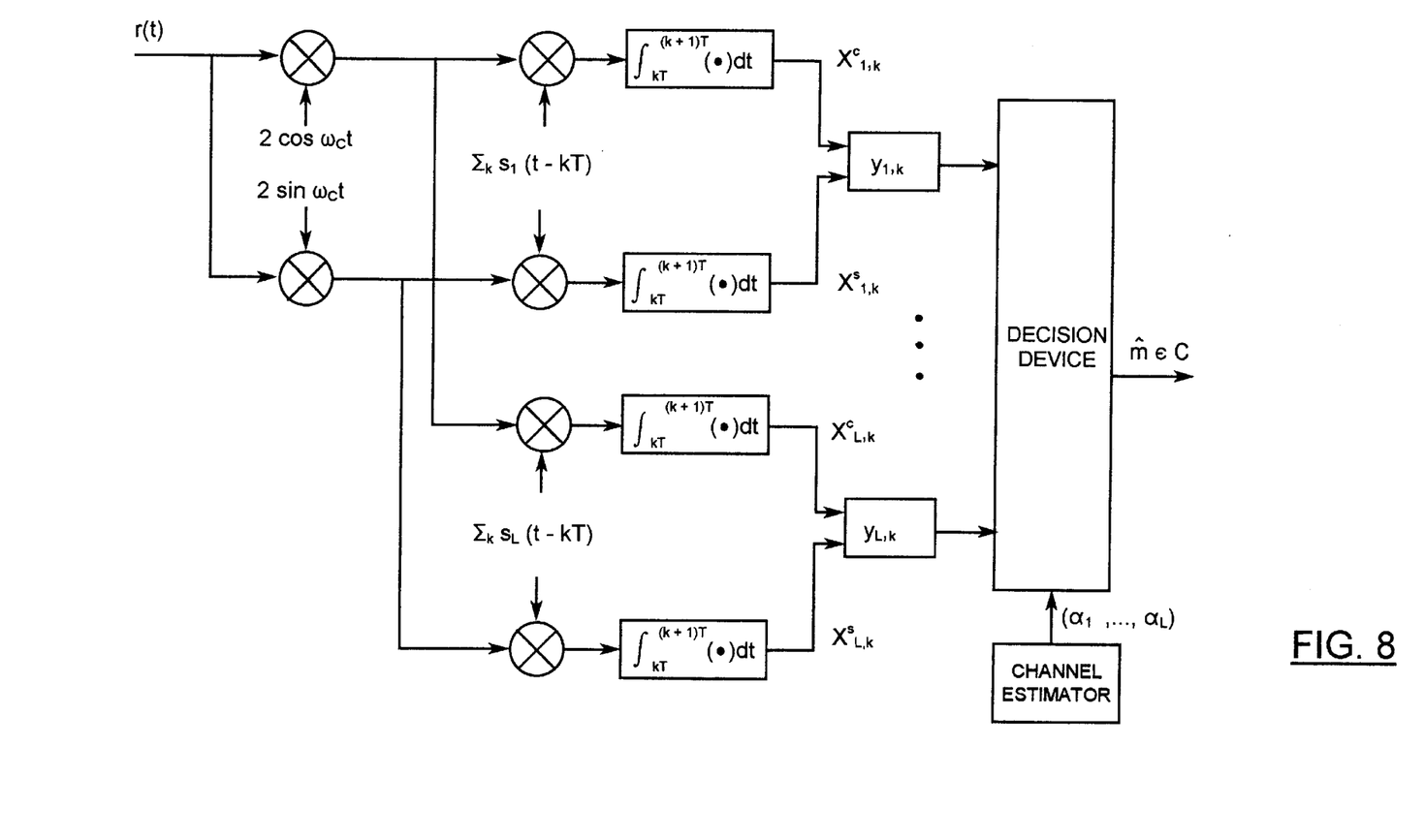
FIG. 8 is a block diagram of a differentially coherent receiver used in the method of the present invention.

FIG. 8 shows a differentially coherent receiver. The noisy decision variables used by the decision device are given by $$y_{i,k} = \frac{X_{i,k}^c X_{i,k-1}^c + X_{i,k}^s X_{i,k-1}^s}{\sqrt{(X_{i,k-1}^c)^2 + (X_{i,k-1}^s)^2}}, \quad 1 \leq i \leq L \tag{2.3}$$

where $$X_{i,k}^c = \alpha_i x_{i,k} \cos(\theta_i) E_s + \eta_{i,k}^c \tag{2.4}$$
$$X_{i,k}^s = \alpha_i x_{i,k} \sin(\theta_i) E_s + \eta_{i,k}^s$$

are the in-phase and quadrature correlator outputs for link l and $$\eta_{i,k}^c = 2 \int_{kT}^{(k+1)T} n(t)s_i(t - kT)\cos(\omega_c t)dt \tag{2.5}$$

$$\eta_{i,k}^s = 2 \int_{kT}^{(k+1)T} n(t)s_i(t - kT)\sin(\omega_c t)dt$$

are zero-mean Gaussian random variables with variance $\alpha^2 = N_0 E_3$, where $$E_s = \int_0^T s_i^2(t)dt,$$

$1 \leq i \leq L$, is the pulse energy.

The vector of variables $(y_{1,k}, y_{2,k}, \ldots, y_{L,k})$ is used by the decision device to decide which L-dimensional information symbol $m_k = (m_{1,k}, m_{2,k}, \ldots, m_{L,k}) \in C$ was transmitted, where C is the constellation of information symbols. The L simultaneous transmissions can be viewed jointly as an L-dimensional vector $(x_{1,k}, x_{2,k}, \ldots, x_{L,k})$ but the information symbol transmitted during the signalling interval [kT,(k+1)T] is $m_k \in C$. The transmitter transmits the information symbol $(m_{1,k}, \ldots, m_{L,k})$ by transmitting the signal level $x_{i,k} = m_{i,k}\text{sgn}(x_{i,k-1})$ on link l, where $\text{sgn}(x)=1$ if $x \geq 0$ and −1 otherwise. Assuming that each symbol in C is transmitted equally likely, the bit rate is $\log_2|C|$ bits per symbol, where $|C|$ is the number of symbols in the constellation C.

With no loss of generality assume $E_s = 1$. At time $t = (k+1)T$ the decision device outputs the symbol $\hat{m} = (\hat{m}_1, \hat{m}_2, \ldots, \hat{m}_L) \in C$ which minimizes the quantity $$\sum_{i=1}^{L} \frac{(y_{i,k} - \alpha_i \hat{m}_i)^2}{(\alpha_i \hat{m}_i/y_{i,k-1})^2 + 1} \tag{2.6}$$

and a decoding error occurs whenever $\hat{m} \neq m_k$.

The reason for setting $x_{i,k} = m_{i,k}\text{sgn}(x_{i,k-1})$ can be seen by assuming a noiseless channel. With $n(t)=0$, we have $$y_{i,k} = \alpha_i x_{i,k}\text{sgn}(x_{i,k-1}) = \alpha_i m_{i,k}\text{sgn}(x_{i,k-1})\text{sgn}(x_{i,k-1}) = \alpha_i m_{i,k}$$

and the decision device will correctly determine which information symbol $(m_{1,k}, m_{2,k}, \ldots, m_{L,k}) \in C$ was sent.

Construction Of Fading-Resistant Constellations

The following parameter, which we call the constellation figure of merit for the Rayleigh fading channel, gives an indication of the performance of a signal constellation at high SNR, $$CFM_{Rayleigh}(C) = \tag{2.7}$$

$$\min_{\substack{m,n,w \in C \\ m+n}} \prod_{i=1}^{L} \left(1 + \gamma \left(\sqrt{\frac{m_i}{(m_i/w_i)^2 + 1}} - \sqrt{\frac{n_i}{(n_i/w_i)^2 + 1}}\right)^2\right) / E$$

where E is the average symbol energy of the constellation C. At large enough SNR we can use the following figure of merit to compare constellations with the same minimum Hamming distance d;

$$CFM_{Rayleigh}(C) = \tag{2.8}$$

$$\min_{\substack{m,n,w \in C \\ m \neq n}} \prod_{\substack{i=1 \\ m_i \neq n_i}}^{L} \left(1 + \gamma \left(\sqrt{\frac{m_i}{(m_i/w_i)^2 + 1}} - \sqrt{\frac{n_i}{(n_i/w_i)^2 + 1}}\right)^2\right) / E$$

Eq. (2.8) looks similar to the distance measure that needs to be maximized in Part A above, where coherent detection is assumed. The difference in these two measures results from the need to take the previous codeword w into account, for the differentially coherent scheme assumed here.

The design problem is to find constellations C which have a large $CFM_{Rayleigh}(C)$. We are interested only in constellations where $m_i \neq n_i$, $1 \leq i \leq L$. We now describe a method for searching for L-dimensional fading-resistant constellations which have a large $CFM_{Rayleigh}$. For the baseline scheme, L bits are transmitted during each signalling interval and we can view the resulting signal as a vertex of an L-dimensional cube. Computation of $CFM_{Rayleigh}(C)$ using (2.7) for this L-dimensional cube C suggests that the bit error rate for this constellation varies only inversely with SNR, which agrees with (2.2). We can increase $CFM_{Rayleigh}$ and thus improve the performance of this constellation by rotating it in L dimensions.

Applying a transformation to the constellation which preserves the Euclidean norms of the L-dimensional points, such as a rotation in L-dimensions, preserves the total energy of the constellation. Since constellations can only be compared fairly when their energies are the same, the transformed constellation's $CFM_{Rayleigh}$ can thus be compared with that of the original constellation without having to renormalize the transformed constellation.

As described in Part A above, one starts off with the L-cube. For example, when L=2, the starting constellation is given by (1.8). The angle of rotation which maximizes (2.8) was found to be approximately $\theta_{opt}=18.6°$, and the resulting rotated constellation is $$C = \begin{bmatrix} -0.63 & -1.27 \\ -1.27 & 0.63 \\ 1.27 & -0.63 \\ 0.63 & 1.27 \end{bmatrix} \quad (2.9)$$

Maximizing (2.7) for several values of the parameter $\gamma$ yielded similar optimum rotation angles. These resulting rotated constellations were compared using simulations to determine the probability of bit error and they were observed to have similar performance.

When L=3 the starting constellation consists of the vertices of a three-dimensional cube and optimization is done over three rotation angles. Eq. (2.8) was maximized over three rotation angles (using a discretization interval of 1° for each angle), as well as (2.7) for several values of $\gamma$. Constellations which maximize (2.7) for different values of $\gamma$ perform differently over different ranges of SNR. Simulations showed that the best constellation among these corresponded to the rotation vector $\epsilon_{opt}=[\epsilon_{12},\epsilon_{13},\epsilon_{23}]=[76°,18°,14°]$, and this constellation has good performance over a moderately large range of SNR. It was also observed that the optimal rotation vector which maximizes (2.7) is not very sensitive to the parameter $\gamma$ in that the same optimal rotation vector maximized (2.7) over large ranges of $\gamma$.

For $L \geq 4$, an exhaustive search over the $$\binom{L}{2}$$

rotation angles in order to maximize $CFM_{Rayleigh}$ for the L-cube proved to be too time consuming. For these constellations, many rotation vectors were picked at random, and a gradient based approach was used to vary the rotation angles so as to converge to a local maximum. For L=4 there are six degrees of freedom, assuming the parameter $\gamma$ is given. Several values of $\gamma$ were assumed, and the performance of constellations that maximized (2.7) for these different values of $\gamma$ were compared. Simulations showed that the rotation vector $\epsilon_{opt}=[\epsilon_{12},\epsilon_{13}, \epsilon_{14},\epsilon_{23},\epsilon_{24},\epsilon_{34}]=[28°,74°,15°,165°,286°,28°]$ yielded a constellation with good performance over a moderately large range of SNR.

Channel Model 2: Multi-frequency Transmitter Diversity

Figure 9:
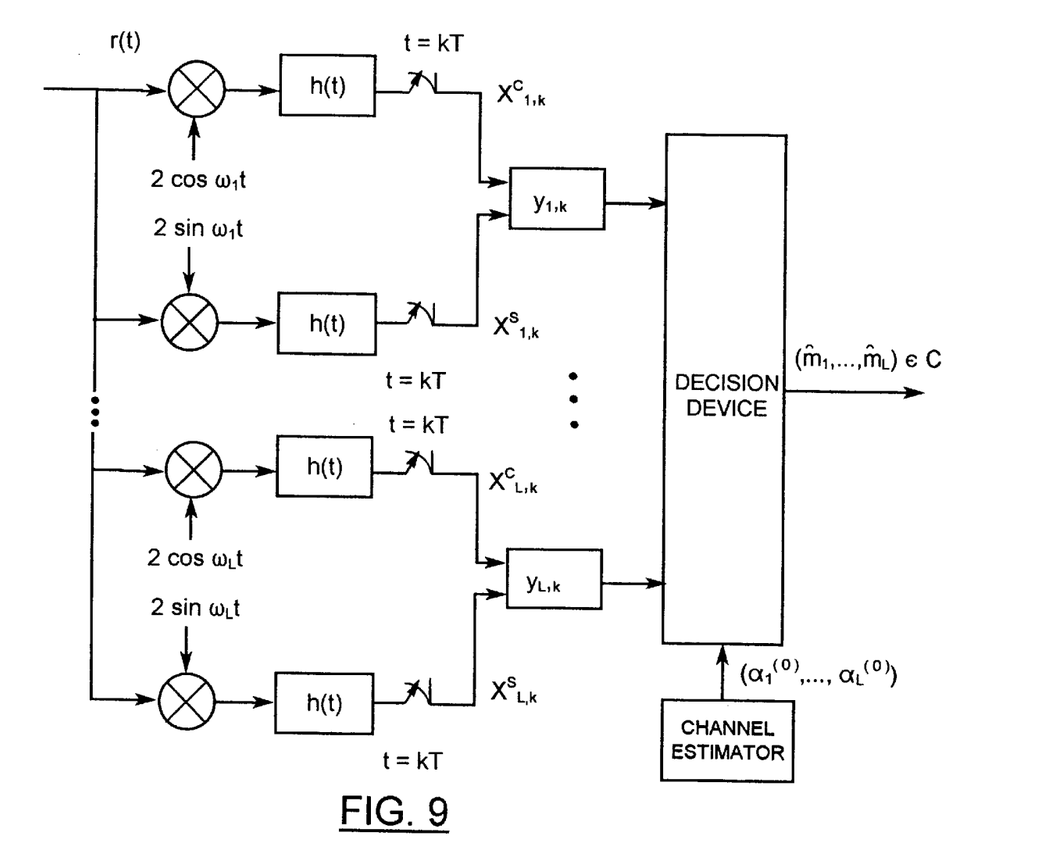
FIG. 9 is a block diagram of a differentially coherent multi-frequency receiver with L demodulators used in the case where transmitter diversity is implemented using multi-frequency transmission in which the mobile receiver does not track the carrier phases of the L transmissions.

Transmitter diversity is implemented using multi-frequency transmission and the mobile receiver does not track the carrier phases of the L transmissions. The differentially coherent receiver has L demodulators and its block diagram is shown in FIG. 9. It is assumed that the carrier frequencies are spaced far apart and that signal components with center frequencies $|w_{11}-w_{12}|$, $w_{11} \neq w_{12}$, resulting from the demodulation operations, are filtered out by the lowpass filtering effect of h(t). The outputs of the matched filters in each branch are sampled at t=kT.

Fading-Resistant Cellular System

For the fading-resistant cellular system, $x_{l,k}^{(0)}$, $1 \leq l \leq L$, are coordinated and the decision device in FIG. 9 makes a decision on the entire received vector $y=(y_{1,k},\ldots,y_{L,k})$. The noisy decision variables used by the decision device are computed as $$y_{l,k} = \frac{X_{l,k}^c X_{l,k-1}^c + X_{l,k}^s X_{l,k-1}^s}{\sqrt{(X_{l,k-1}^c)^2 + (X_{l,k-1}^s)^2}}, \quad 1 \leq l \leq L. \quad (2.10)$$

We assume that the mobile receiver correctly estimates the vector of fading amplitudes $\alpha=(\alpha_1^{(0)},\ldots,\alpha_L^{(0)})$. The transmitted vector of interest is $m=(m_{1,k}^{(0)},\ldots,m_{L,k}^{(0)}) \in C$, where C is an L-dimensional constellation. The decision device outputs the symbol $\hat{m}=(\hat{m}_1,\hat{m}_2,\ldots,\hat{m}_L) \in C$ which minimizes the quantity $$\sum_{i=1}^{L} \frac{(y_{i,k} - a_i \hat{m}_i)^2}{(a_i \hat{m}_i / y_{i,k-1})^2 + 1} \quad (2.11)$$

and a decoding error occurs whenever $\hat{m} \neq m$.

Channel Model 3: Time Interleaving and Power Control

Diversity can be achieved using time interleaving and power control. In this case the transmitter uses a single antenna and a single carrier frequency. During each signalling interval, the transmitter transmits a coordinate of an L vector. A vector of L coordinates is transmitted by transmitting each coordinate in a separate power control time frame. The transmitter power remains constant for B signalling intervals (the duration of a power control time frame), and depending on the power received by the mobile receiver, the transmitter may either increase or decrease power during the next power control frame. The coordinates of an L vector are each transmitted in a different power control frame, and so the fading amplitudes associated with each coordinate will be independent, so that the fading-resistant scheme will perform well. The larger the value of B the simpler the implementation, however, the power control scheme will not compensate for shorter durations of fluctuations in received power. FIG. 7 shows an example.

Further details of the fading resistant method are disclosed in V. M. DaSilva, E. S. Sousa, "Fading-resistant transmission from several antennas", *Sixth International Symposium on Personal, Indoor and Mobile Radio Communications*, PIMRC '95, Toronto, Canada, Sep. 27–29, 1995, pp. 1218–1222; and Victor M. DaSilva, Ph.D. Thesis, "Transmitter Diversity And Fading-Resistant Modulation For Wireless Communication Systems", Department of Electrical And Computer Engineering, University of Toronto, February, 1996; both references being incorporated herein by reference.

It will be appreciated that the method of fading resistant modulation for wireless communication systems disclosed herein has been described and illustrated by way of example only and those skilled in the art will understand that numerous variations of the method may be made without departing from the scope of the invention

APPENDIX A

We show how an L×L orthogonal matrix A can be written as the product of $$\binom{L}{2}$$

rotation matrices and a reflection matrix.
Theorem: (QR Factorization)

Given an n×m matrix A with n≧m, there is an n×m matrix Q with orthonormal columns and an upper triangular m×m matrix R such that A=QR. If m=n, Q is orthogonal. (For example, see R. A. Horn, C. R. Johnson, *Matrix Analysis*, Cambridge University Press, 1985., p. 112).

There are several algorithms that can be used to compute Q and R. For example, methods based on Householder and Givens transformations can be used. The method based on Givens transformations is of particular usefulness in the present invention. If A is an n×n matrix, then A=QR→$Q^T$A=R. The QR factorization method based on Givens transformations gives us a method for writing $Q^T$ as the product of n(n−1)/2 Givens matrices. The method is given below, see G. H. Golub, C. F. Van Loan, *Matrix Computations*, 2nd ed., The John Hopkins University Press, 1989., p. 214.

```
%QR factorization algorithm for an n×n matrix A.
%compute QT, the transpose of Q, so that QT*A is upper triangular
matrix R
QT=I_{n×n}
Atemp=A
for col = 1: n−1
    for row=col + 1:n,
        [c,s] = givens(Atemp(col,col), Atemp(row,col))
        %the next step zeros the (row,col) element in Atemp
        QT=G(col,row,c,s)^T*QT
        Atemp=G(col,row,c,s)^T*Atemp
    end
end
where
function[c,s] = givens(a,b)
%compute c and s so that [c s; −s c]T[a; b]=[r; 0], where
r is any real number
if $b=0 $
    c = 1; s = 0
else
s = b/(a² + b²)^{1/2}; c = −as/b
end
```
and $$G(i, k, c, s) = \begin{bmatrix} 1 & & & & & & \\ & \ddots & & & & & \\ & & c & \ldots & s & & \\ & & \vdots & & \vdots & & \\ & & -s & \ldots & c & & \\ & & & & & \ddots & \\ & & & & & & 1 \end{bmatrix}$$

is an n×n matrix called the Givens (or Jacobi) matrix. It is possible to solve for θ such that c=cosζ, s=sinζ. The matrix consists of 1's on the main diagonal except for the two elements c in rows (and columns) l and k. All off-diagonal elements are zero except the two elements s and −s. Post-multiplication of a vector by G rotates the vector counter-clockwise by ζ degrees with respect to the (i,k) plane. To simplify notation later on, we define G(i,k,ζ)=G(i,k,c,s).

Proposition 1

If an n×n matrix A is orthogonal, then a QR factorization algorithm yields Q=A$\hat{I}$ where $\hat{I}$ denotes a matrix in which each main diagonal element is either 1 or −1 and all off-diagonal elements are zero.

Proof $Q^T$ is orthogonal because Q is orthogonal. If A is orthogonal then $Q^T$A=R is also orthogonal since the product of two orthogonal matrices is an orthogonal matrix. Since R is an upper triangular orthogonal matrix, each main diagonal element must be either 1 or −1 and all off-diagonal elements must be zero. We have A=Q$\hat{I}$→Q=A$\hat{I}^{-1}$=A$\hat{I}^T$=A$\hat{I}$.

Proposition 2

Any orthogonal n×n matrix A can be written as the product of n(n−1)/2 n×n Givens matrices and an n×n $\hat{I}$ matrix.

Proof

The proof follows directly from the proof of the previous proposition. Given an arbitrary orthogonal n×n matrix A we have a method for constructing Q, the product of n(n−1)/2 Givens matrices, such that A=Ql. Note that the identity matrix is a Givens matrix as well as an $\hat{I}$ matrix.

For example, all 2×2 orthogonal matrices have the form $$A = \begin{bmatrix} \cos\theta & \sin\theta \\ -\sin\theta & \cos\theta \end{bmatrix}$$

or $$A = \begin{bmatrix} \cos\theta & \sin\theta \\ \sin\theta & -\cos\theta \end{bmatrix}$$

This is a well known fact (for example, see W. K Nicholson, *Elementary Linear Algebra with Applications*, PWS-KENT Publishing Co., Boston, 1986, p. 282). The first form corresponds to $G(1,2,\theta)1_{2\times 2}$ and the second form corresponds to $G(1,2,\theta)(-1_{2\times 2})$. Proposition 2, together with the QR factorization method using Givens transformations, implies that all 3×3 orthogonal matrices have the form $$\begin{aligned} A &= G(1,2,\theta_{12})G(1,3,\theta_{13})G(2,3,\theta_{23})\hat{I}_{3\times 3} \\ &= \begin{bmatrix} \cos\theta_{12} & \sin\theta_2 & 0 \\ -\sin\theta_{12} & \cos\theta_{12} & 0 \\ 0 & 0 & 1 \end{bmatrix} \begin{bmatrix} \cos\theta_{13} & 0 & \sin\theta_{13} \\ 0 & 1 & 0 \\ -\sin\theta_{13} & 0 & \cos\theta_{13} \end{bmatrix} \begin{bmatrix} 1 & 0 & 0 \\ 0 & \cos\theta_{23} & \sin\theta_{23} \\ 0 & -\sin\theta_{23} & \cos\theta_{23} \end{bmatrix} \begin{bmatrix} \pm 1 & 0 & 0 \\ 0 & \pm 1 & 0 \\ 0 & 0 & \pm 1 \end{bmatrix} \end{aligned}$$

In general, any L×L orthogonal matrix A can be factored into L(L−1)/2 ($\binom{L}{2}$) rotation matrices and an $\hat{I}$ matrix as follows $$A = \left( \prod_{\substack{1 \leq i \leq L-1 \\ i+1 \leq j \leq L}} G(i,j,\theta_{ij}) \right) \cdot \hat{I}_{L \times L}$$

for suitable $\theta_{ij}$.

APPENDIX B

We prove that the method given in Section 1.1.3 results in the assignment of bit patterns that differ in only one location to points in the Kerpez constellation that are separated by $d_{min}$.

Assume that the bit patterns corresponding to the distinct constellation points $(i_1, i_2, \ldots, i_L)$ and $(j_1, j_2, \ldots, j_L)$ are $(a_1, a_2, \ldots, a_L)$ and $(b_1, b_2, \ldots, b_L)$, respectively. Since the points are distinct, a property of the Kerpez constellation is that $i_v \neq j_v$ for all $v \in \{1, 2, \ldots, L\}$. Define $d_{vij} = |i_v - j_v|$. From [3], if $d_{min}^2 = \sum_{v=1}^{L} d_{vij}^2$ then the distance vector between these two points, $[d_{1ij}, d_{2ij}, \ldots, d_{Lij}]$, is a permutation of $[2^{L-1}, 2^{L-2}, \ldots, 2^2, 2, 1]$. According to the method in Section 1.1.3, we have $i_1 = 1 + \sum_{n=1}^{L} 2^{n-1} a_n$ and $j_1 = 1 + \sigma_{n=1}^{L} 2^{n-1} b_n$. Assume that these two bit patterns differ in the $m^{th}$ location, $1 \leq m \leq L$, that is, $$b_n = \begin{cases} a_n, & n \neq m \\ a_n \oplus 1, & n = m \end{cases} \tag{B.1}$$

We want to show that the distance vector between these two constellation points is a permutation of $[2^{L-1}, 2^{L-2}, \ldots, 2^2, 2, 1]$.

We have $$\begin{aligned} j_1 - i_1 &= \sum_{n=1}^{L} 2^{n-1}(b_n - a_n) \\ &= 2^{m-1}(a_m \oplus 1 - a_m) \\ &= \pm 2^{m-1} \end{aligned} \tag{B.2}$$

Also, for $2 \leq v \leq L$, we get $$j_v - i_v = (j_1 - 1)2^{L-v+1} \mod 2^L - (i_1 - 1)2^{L-v+1} \mod 2^L - \tag{B.3}$$

$$\left\lceil \frac{j_1}{2^{v-1}} \right\rceil + \left\lceil \frac{i_1}{2^{v-1}} \right\rceil$$

and $$\begin{aligned} (i_1 - 1)2^{L-v+1} \mod 2^L &= \left( \sum_{n=1}^{L} 2^{n-1} a_n \right) 2^{L-v+1} \mod 2^L \\ &= \sum_{n=1}^{v-1} 2^{L+n-v} a_n \mod 2^L \\ &= \sum_{n=1}^{v-1} 2^{L+n-v} a_n \end{aligned} \tag{B.4}$$

where (B.4) follows from the relation $\sigma_{n=1}^{v-1} 2^{L+n-v} a_n \leq 2^{L-v} \sigma_{n=1}^{v-1} 2^n < 2^L$. Also, $$\begin{aligned} \left\lceil \frac{i_1}{2^{v-1}} \right\rceil &= \left\lceil \frac{1 + \sum_{n=1}^{L} 2^{n-1} a_n}{2^{v-1}} \right\rceil \\ &= \sum_{n=v}^{L} 2^{n-v} a_n + \left\lceil \frac{1 + \sum_{n=1}^{v-1} 2^{n-1} a_n}{2^{v-1}} \right\rceil \\ &= \sum_{n=v}^{L} 2^{n-v} a_n + 1 \end{aligned} \tag{B.5}$$

where (B.5) follows from the relation $1 + \sigma_{n=1}^{v-1} a_n \leq 1 + \sigma_{n=1}^{v-1} 2^{n-1} = 2^{v-1}$. Substituting (B.4) and (B.5) in (B.3), we have $$j_v - i_v = \sum_{n=1}^{v-1} 2^{L+n-v}(b_n - a_n) + \sum_{n=v}^{L} 2^{n-v}(a_n - b_n), 2 \leq v \leq L. \tag{B.6}$$

There are two cases to consider. Case i) $1 \leq m \leq v-1 \rightarrow m+1 \leq v \leq L$. Eq. (B.6) gives $|j_v - i_v| = |2^{L+m-v}(a_m \oplus 1 - a_m)| = 2^{L+m-v}$. Case ii) $v \leq m \leq L \rightarrow 2 \leq v \leq m$. Eq. (B.6) gives $|j_v - i_v| = |2^{m-v}(a_m - a_m \oplus 1)| = 2^{m-v}$. Thus, $[d_{1ij}, d_{2ij}, \ldots, d_{m-1ij}, d_{mij}, d_{m+1ij}, \ldots, d_{Lij}] = [2^{m-1}, 2^{m-2}, \ldots, 2, 1, 2^{L-1}, 2^{L-2}, \ldots, 2^m]$ which is a permutation of the minimum distance vector, as required.

Therefore what is claimed is:

1. A method of fading-resistant modulation for wireless communication systems using transmitter antenna diversity, comprising:

a) selectively constructing an L-dimensional signaling constellation comprising Q points, wherein each of said Q points represents a vector in an L-dimensional vector space, the vector space comprising L orthogonal coordinate axes and each vector having L vector components, and wherein any two of said vectors differ in a plurality of corresponding vector components; and b) transmitting each of said L components of a given constellation point of said signalling constellation over one of either L different antennas, L different carrier frequencies and L different time slots.

2. The method according to claim 1 wherein the signaling constellation is constructed by applying a transformation to an L-dimensional hypercube, and wherein said transformation is effective to preserve the Euclidean distances between the points of the signaling constellation.

3. The method according to claim 1 wherein in the signaling constellation substantially none of the points of the constellation are superimposed by collapsing said constellation parallel to any of said coordinate axes.

4. The method according to claim 1 wherein said signaling constellation is the Kerpez constellation comprising $Q=M^L$ constellation points $(m_1, m_2, \ldots, m_L)$ wherein M is an integer substantially equal to the number of bits transmitted per dimension, wherein specification of $i_1 \in \{1, 2, \ldots, M^L\}$ uniquely defines an L-dimensional alphabet symbol, and wherein said L-dimensional alphabet symbol has $j^{th}$ coordinate given by $m_j = -2i_j + M^L + 1$, $i_j \in \{1, 2, \ldots, M^L\}$ where $i_j$, $2 \leq j \leq L$, is related to $i_1$ by $[i_l]i_j = [(i_1 - 1)M^{L-j+1}] \mod M^{L-j+1} + 1[i_1/m^{j-1}]$.

5. The method according to claim 1 wherein the signals corresponding to the components of the signaling constellation transmitted in each antenna, carrier frequency or time slot are differentially encoded.

6. The method according to claim 4 wherein the signals corresponding to the components of the signaling constellation transmitted in each antenna, carrier frequency or time slot are differentially encoded.

7. The method according to claim 1 wherein said signals are transmitted over L carrier frequencies using at least one antenna, said carrier frequencies having an effective frequency spacing so that fading is substantially independent over said L different carrier frequencies.

8. The method according to claim 1 wherein said signals are transmitted over L different time slots wherein a coordinate of a point of said signaling constellation is transmitted during each time slot.

9. The method according to claim 8 wherein the time slots correspond to different power control groups, and wherein the transmitted power is adjusted once per power control group, and wherein independent fading in the different time slots correspond to power control errors.

10. The method according to claim 1 wherein said signaling constellation is used to provide symbols for a trellis code or convolutional code, or block code.

11. The method according to claim 1 wherein a sequence of transmitted components in each antenna, frequency, or time slot, constitutes a PAM, BPSK, or QPSK signal.

12. The method according to claim 1 wherein a sequence of transmitted components in each antenna, frequency, or time slot, constitute a spread spectrum or CDMA signal.

13. The method according to claim 1 wherein the L-components transmitted over the L-different antennas represent a set of L orthogonal waveforms.

14. The method according to claim 1 wherein any two of said vectors differ in substantially all corresponding vector components.

15. The method according to claim 9 wherein the wireless communication system is a cellular communication system including at least forward and reverse links.

16. A method of fading-resistant modulation for wireless communication systems, comprising:

a) selectively constructing an L-dimensional signaling constellation comprising $2^L$ constellation points wherein each of said $2^L$ constellation points represents an L-component vector in an L-dimensional vector space, said L-dimensional vector space including L orthogonal coordinate axis, and wherein any two of said vectors differ in a plurality of their components; and b) transmitting each of said L components of a given constellation point of said signalling constellation over one of either L different antennas, L different carrier frequencies and L different time slots.

17. The method according to claim 16 wherein the signaling constellation is constructed by applying an orthogonal transformation to an L-dimensional hypercube to form a transformed hypercube with said constellation points being the vertices of said transformed hypercube.

18. The method according to claim 17 wherein the orthogonal transformation of the hypercube comprises representing said hypercube constellation as a matrix with rows of said matrix being equal to the vertices of the hypercube, and multiplying said matrix by an effective L×L orthogonal matrix.

19. The method according to claim 16 wherein said wireless communication system is a cellular system having a base station and mobile terminals, forward and reverse links, and wherein said signals are transmitted from said base station.

20. The method according to claim 17 wherein L=2 and said orthogonal transformation is a rotation of about 31.7 degrees.

21. The method according to claim 16 wherein the signals corresponding to the components of the signaling constellation transmitted over each carrier frequency, each antenna or time slot are differentially encoded.

22. The method according to claim 16 wherein a sequence of transmitted components in each antenna, frequency, or time slot, constitutes a PAM, BPSK, or QPSK signal.

23. The method according to claim 16 wherein a sequence of transmitted components in each antenna, frequency, or time slot, constitute a spread spectrum or CDMA signal.

24. The method according to claim 16 wherein the L-components transmitted over the L-different antennas represent a set of L orthogonal waveforms.

25. The method according to claim 16 wherein any two of said vectors differ in substantially all corresponding vector components.

* * * * *